United States Patent
Nishikawa

(10) Patent No.: US 6,231,281 B1
(45) Date of Patent: May 15, 2001

(54) THREAD MILLING CUTTER WITH DRILLING EDGES

(75) Inventor: Tsuneo Nishikawa, Suzuka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/341,264

(22) PCT Filed: Dec. 11, 1998

(86) PCT No.: PCT/JP98/05595

§ 371 Date: Jul. 7, 1999

§ 102(e) Date: Jul. 7, 1999

(87) PCT Pub. No.: WO99/29457

PCT Pub. Date: Jun. 17, 1999

(30) Foreign Application Priority Data

Dec. 11, 1997 (JP) .................................................. 9-362232

(51) Int. Cl.[7] ........................................................ B23B 51/00
(52) U.S. Cl. ............................ 408/222; 408/224; 409/65; 470/199
(58) Field of Search .................................. 408/222, 223, 408/224; 409/74, 65, 78; 470/199

(56) References Cited

U.S. PATENT DOCUMENTS

| | | | |
|---|---|---|---|
| 194,469 | * | 8/1877 | Schaub .................................. 470/199 |
| 568,277 | * | 9/1896 | Rall ...................................... 470/199 |
| 1,034,724 | * | 8/1912 | Mueller ................................. 470/199 |
| 1,863,046 | * | 6/1932 | Githens et al. ........................ 470/199 |
| 1,874,378 | * | 8/1932 | Steinruck ............................. 470/199 |
| 2,898,612 | * | 8/1959 | Hofbauer ............................. 470/199 |
| 4,271,554 | * | 6/1981 | Grenell ................................. 470/199 |
| 4,831,674 | * | 5/1989 | Bergstrom et al. .................... 409/74 |
| 4,930,949 | * | 6/1990 | Giessler ............................... 408/222 |
| 4,943,191 | * | 7/1990 | Schmitt ................................. 409/74 |
| 5,733,078 | * | 3/1998 | Matsushita et al. ................... 409/74 |

* cited by examiner

Primary Examiner—A. L. Wellington
Assistant Examiner—Monica S. Carter
(74) Attorney, Agent, or Firm—Connolly Bove Lodge & Hutz, LLP

(57) ABSTRACT

A thread milling cutter with drill blade has a drill blade 6 at the leading end of a land 5 divided by grooves 3 and a tapered tapping blade 7 provided behind the drill blade, with the upper end thereof in the direction of rotation projecting outward beyond the drill blade 6. The drill blade 6 first pre-drills a hole and then the tapered strong tapping blade 7 cuts internal threads on the inner wall of the pre-drilled hole.

1 Claim, 2 Drawing Sheets

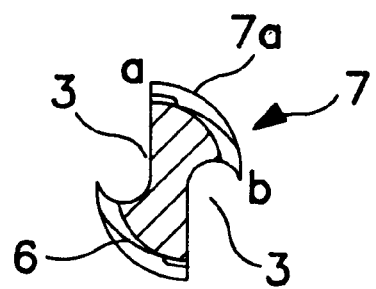
FIG. 3
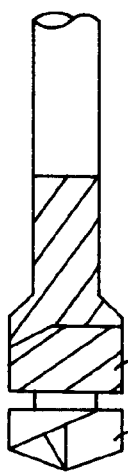
FIG. 4(a)
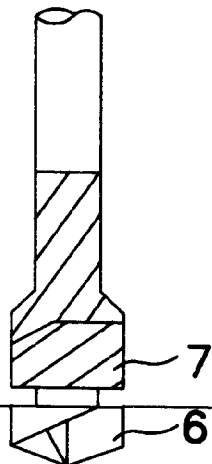
FIG. 4(b)
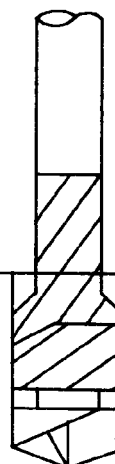
FIG. 4(c)
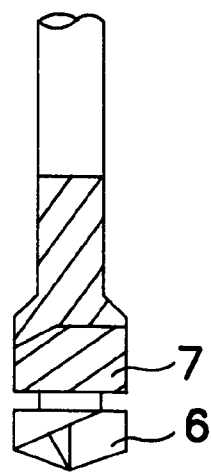
FIG. 4(d)
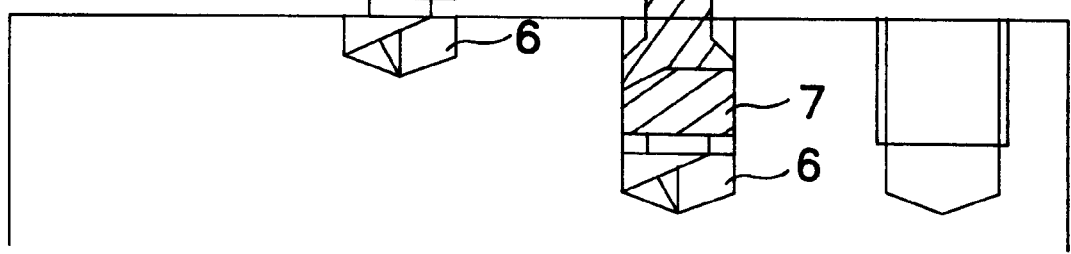

THREAD MILLING CUTTER WITH DRILLING EDGES

FIELD OF THE INVENTION

This invention relates to thread milling cutters with drill blade having a pre-drilling blade and a tapping blade.

BACKGROUND OF THE INVENTION

Japanese Provisional Utility Model Publication No. 72325 of 1993 discloses a thread milling cutter with drill blade having a pre-drilling blade at the tip of a thread milling cutter.

This thread milling cutter has a tapping blade in each of the auxiliary lands that are twice as large as the main lands by forming an auxiliary groove in the main lands provided on both sides of the main groove to ensure smooth removal of chips from pre-drilling and efficient accomplishment of subsequent thread cutting.

With this type of thread milling cutters, however, provision of the auxiliary groove inevitably decreases the cross-sectional area of each auxiliary land and thereby reduces the strength of the cutting blades formed therein. Then, stresses set up during high-speed cutting operation would break the thread milling cutter.

The object of this invention is to provide new type of thread milling cutters with drill blade that permit high-speed cutting without breaking.

SUMMARY OF THE INVENTION

A thread milling cutter with drill blade according to this invention comprises a drill blade provided at the leading end of a land divided by axial grooves and a tapered tapping blade provided behind the drill blade, with the upper end thereof in the direction of rotation projecting outward beyond the drill blade so as to decrease cutting resistance to the tapping blade and increase the strength of the thread milling cutter.

BRIEF DESCRIPTION OF THE DRAWINGS

FIG. 3 is a cross-sectional view taken along the line 2—2 of FIG. 1; and

FIGS. 4(a), 4(b), 4(c), and 4(d) show the pre-drilling and tapping processes.

PREFERRED EMBODIMENTS OF THE INVENTION

Figure 1:
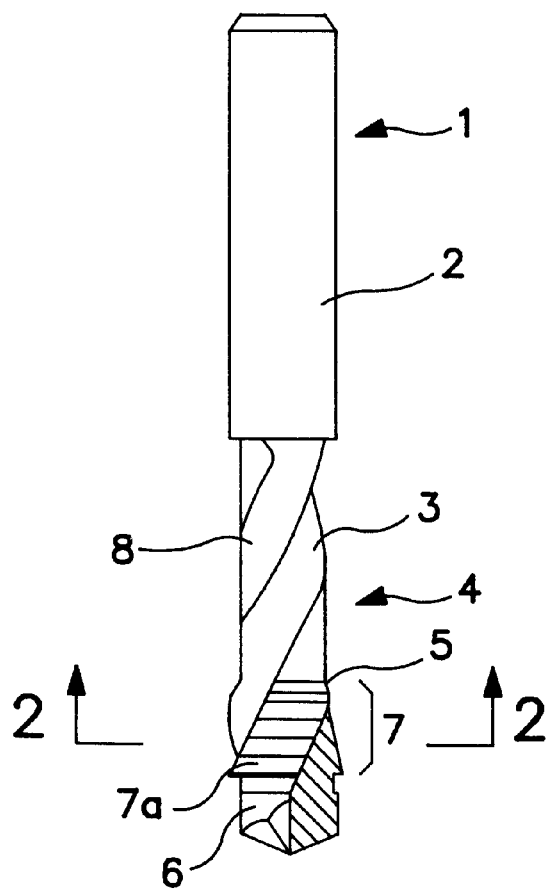
FIG. 1 shows a thread milling cutter with drill blade according to this invention.
Figure 2:
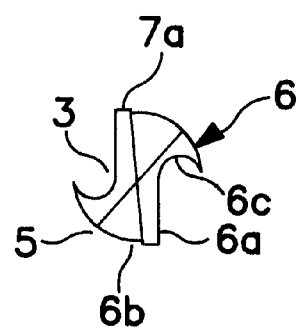
FIG. 2 shows the same thread milling cutter viewed from the blade tip thereof.

FIGS. 1 to 3 illustrate a preferred embodiment of this invention. A thread milling cutter with drill blade 1 comprises a base end that is formed as a shank that may be gripped by a numerically controlled milling machine or the like and rotated about the axis thereof and a tip that is formed as a blade segment 4 having grooves 3 twisted in the direction of rotation and cutting.

The blade segment 4 have lands 5 divided by grooves 3 so as to lie symmetrical about the axis of rotation. A drill blade 6 that performs pre-drilling prior to tapping is formed at the leading end of each land 5.

The drill blade 6 comprises bottom blades 6a and outer blades 6b that are a continuation of the bottom blades 6a, as shown in FIG. 2. The edges of the paired bottom blades 6a closer to the center of the thread milling cutter are joined together by a thinning 6c.

The land 5 above the drill blade 6 has an integrally formed tapping blade 7 to cut internal threads on the inner wall of the pre-drilled hole.

The tapping blade 7 comprises multiple axially extending leadless tapping edges 7a, as shown in FIG. 3. Each tapping edge 7a is formed as a tapered edge with the upper end a thereof in the direction of rotation projecting outward beyond the diameter of the drill blade 6 by an amount equal to the height of the tapping edge 7a and the lower end b thereof in the direction of rotation having a height substantially equal to the height of the drill blade 6.

The base end of the blade segment 4 constitutes a small-diameter segment 8 divided by the grooves 3 through which chips produced by pre-drilling and tapping are removed.

The thread milling cutter with drill blade 1 just described is mounted on a numerically controlled milling machine or a machine center and used for tapping. The thread milling cutter 1 is first placed in the tapping position as shown in FIG. 4(a). Then, the thread milling cutter is rotated at a speed of 6000 r.p.m. to carry out pre-drilling with the drill blade 6 as shown in FIG. 4(b).

When pre-drilling has proceeded to a desired depth, the thread milling cutter 1 is moved forward while controlling the feed rate to one that is equivalent to one pitch of the tapping blade per rotation, whereby the tapping blade 7 cuts internal threads on the inner surface of a hole made by the drill blade 6.

Because the tapping edge 7a has the upper end a in the direction of rotation that projects outward beyond the drill blade 6 and has a tapered shape extending in the circumferential direction of the land 5, the amount of cutting varies with the angle of rotation. Therefore, the tapping edges 7a are not subjected to any excessive cutting resistance. Formed on the surface of the land 5 having a larger cross-sectional area than the conventional lands divided by auxiliary grooves, the tapping edges 7a have great enough length and strength to cut internal threads on the inner wall of the pre-drilled hole with powerful cutting forces.

Chips produced by the drill blade 6 and tapping blade 7 are continuously discharged from the blade segment 4 through the grooves 3 at the base end to the small-diameter segment 8.

In the embodiment described above, pre-drilling and tapping are carried out separately. However, simpler feed control can be achieved by carrying out pre-drilling and tapping by the tapping edges 7a simultaneously by giving a synchronous feed corresponding to one pitch at a speed of, for example, 8000 r.p.m.

INDUSTRIAL APPLICABILITY

As described above, a thread milling cutter with drill blade according to this invention has a drill blade formed at the leading end of the lands divided by grooves and a tapered tapping blade provided behind the drill blade, with the upper end thereof in the direction of rotation projecting outward beyond the drill blade. The thread milling cutter first pre-drills a hole and then efficiently cuts internal threads on the inner wall of the pre-drilled hole with the strong tapered tapping blade without causing blade breakage. In addition, easy chip removal through the grooves permit preventing clogging.

What is claimed is:

1. A thread milling cutter with drill blade for simultaneously pre-drilling and tapping on the inner wall of a pre-drilled hole, comprising:
   a drill blade provided at the leading end of a land, which is divided by axial grooves;
   a tapered tapping blade provided circumferentially on said land and adjacent to the rear end of said drill blade, along the longitudinal axis of said cutter; and
   the leading edge of said tapping blade, in the direction of rotation, projecting radially outward beyond said drill blade and the trailing edge of said tapping blade, in the direction of rotation, projecting radially outward to a radius substantially equal to the outermost radius of said drill blade.

* * * * *